(12) United States Patent
Kumar et al.

(10) Patent No.: US 10,671,910 B2
(45) Date of Patent: Jun. 2, 2020

(54) SPACE-EFFICIENT DYNAMIC ADDRESSING IN VERY LARGE SPARSE NETWORKS

(71) Applicant: International Business Machines Corporation, Armonk, NY (US)

(72) Inventors: Arvind Kumar, Chappaqua, NY (US); Winfried W. Wilcke, Los Altos Hills, CA (US)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 14/960,523

(22) Filed: Dec. 7, 2015

(65) Prior Publication Data

US 2017/0161605 A1 Jun. 8, 2017

(51) Int. Cl.
*G06N 3/063* (2006.01)

(52) U.S. Cl.
CPC ................... *G06N 3/063* (2013.01)

(58) Field of Classification Search
CPC ....................................... G06N 3/063
See application file for complete search history.

(56) References Cited

U.S. PATENT DOCUMENTS

| | | | | |
|---|---|---|---|---|
| 4,797,882 A | * | 1/1989 | Maxemchuk | G06F 15/17343 370/406 |
| 8,429,107 B2 | | 4/2013 | Denneau et al. | |
| 8,799,543 B2 | | 8/2014 | Amit et al. | |
| 8,843,425 B2 | | 9/2014 | Modha | |
| 9,104,973 B2 | | 8/2015 | Izhikevich et al. | |
| 2004/0105497 A1 | * | 6/2004 | Takakura | H04N 19/176 375/240.23 |
| 2013/0073500 A1 | | 3/2013 | Szatmary et al. | |
| 2013/0337789 A1 | * | 12/2013 | Johnson | H04W 4/02 455/414.1 |
| 2014/0188771 A1 | * | 7/2014 | Modha | G06N 3/063 706/25 |
| 2014/0258199 A1 | | 9/2014 | Modha | |

OTHER PUBLICATIONS

P.B. Callahan et al., "A Decomposition of Multidimensional Point Sets with Applications to k-Nearest-Neighbors and n-Body Potential Fields," Journal of the Association for Computing Machinery (JACM), Jan. 1995, pp. 67-90, vol. 42, No. 1.

(Continued)

*Primary Examiner* — Alexey Shmatov
*Assistant Examiner* — Robert Bejcek, II
(74) *Attorney, Agent, or Firm* — Vazken Alexanian; Ryan, Mason & Lewis, LLP

(57) ABSTRACT

A connectivity look up structure is maintained for a network that comprises a plurality of nodes, each node is connectable to one or more other nodes, and nodes that are connected tend to be local to one another in the network, and the number of node connections in the network tends to be sparse in relation to the number of potential node connections in the network. The connectivity look up structure stores, for a given node, an address of each other node that is connected to the given node, wherein the stored address for the other node is represented as a run-length encoded difference between a full network address of the given node and a full network address of the other node.

20 Claims, 6 Drawing Sheets

| TABLE HEADER: CELL m ABSOLUTE ADDRESS (64 BITS) AND CELL STATUS DATA (8 BITS) | | | | 505 |
|---|---|---|---|---|
| SIGN BITS FOR CELL n1 | ENCODED NUMBER OF LEADING ZERO BITS FOR CELL n1 | VARIABLE LENGTH FIELD FOR CELL n1 WHICH CONTAINS ADDRESS DIFFERENCE BITS STARTING FROM FIRST NON-ZERO DIFFERENCE BIT THROUGH TO THE LAST DIFFERENCE BIT | 8 BIT DATA FOR THIS SYNAPSE | |
| SIGN BITS FOR CELL n2 | ENCODED NUMBER OF LEADING ZERO BITS FOR CELL n2 | VARIABLE LENGTH FIELD FOR CELL n2 WHICH CONTAINS ADDRESS DIFFERENCE BITS STARTING FROM FIRST NON-ZERO DIFFERENCE BIT THROUGH TO THE LAST DIFFERENCE BIT | 8 BIT DATA FOR THIS SYNAPSE | |
| SIGN BITS FOR CELL n3 | ENCODED NUMBER OF LEADING ZERO BITS FOR CELL n3 | VARIABLE LENGTH FIELD FOR CELL n3 WHICH CONTAINS ADDRESS DIFFERENCE BITS STARTING FROM FIRST NON-ZERO DIFFERENCE BIT THROUGH TO THE LAST DIFFERENCE BIT | 8 BIT DATA FOR THIS SYNAPSE | |
| ⋮ | ⋮ | ⋮ | ⋮ | |
| SIGN BITS FOR CELL nN | ENCODED NUMBER OF LEADING ZERO BITS FOR CELL nN | VARIABLE LENGTH FIELD FOR CELL nN WHICH CONTAINS ADDRESS DIFFERENCE BITS STARTING FROM FIRST NON-ZERO DIFFERENCE BIT THROUGH TO THE LAST DIFFERENCE BIT | 8 BIT DATA FOR THIS SYNAPSE | |
| END OF TABLE MARKER | END OF TABLE MARKER | END OF TABLE MARKER | END OF TABLE MARKER | |
| END OF TABLE MARKER (FOR REDUNDANCY) | END OF TABLE MARKER (FOR REDUNDANCY) | END OF TABLE MARKER (FOR REDUNDANCY) | END OF TABLE MARKER (FOR REDUNDANCY) | |

500

510 / 520 / 530 / 540 /

(56) References Cited

OTHER PUBLICATIONS

L. Nyland et al., "Fast N-Body Simulation with CUDA," GPU Gems, Aug. 2007, pp. 677-696, vol. 3, No. 1.
J.D. Owens et al., "GPU Computing," Proceedings of the IEEE, May 2008, pp. 879-899, vol. 96, No. 5.
Bernard Hellwig, "A Quantitative Analysis of the Local Connectivity Between Pyramidal Neurons in Layers 2/3 of the Rat Visual Cortex," Biological Cybernetics, Jan. 2000, pp. 111-121, vol. 82, No. 2.

* cited by examiner

| 210 | 220 |
|---|---|
| ADDRESS OF CELL m (64 BITS) | DATA BITS OF SYNAPSE – e.g., SYNAPTIC STRENGTH AND/OR PERMANENCE – EXPECTED TO BE 8 BITS |
| ABSOLUTE ADDRESS OF n1 (64 BITS) | DATA BITS FOR SYNAPSE CONNECTING m TO n1 |
| ABSOLUTE ADDRESS OF n2 (64 BITS) | DATA BITS FOR SYNAPSE CONNECTING m TO n2 |
| ABSOLUTE ADDRESS OF n3 (64 BITS) | DATA BITS FOR SYNAPSE CONNECTING m TO n3 |
| ⋮ | ⋮ |
| ABSOLUTE ADDRESS OF nN (64 BITS) | DATA BITS FOR SYNAPSE CONNECTING m TO nN |
| END OF TABLE MARKER | END OF TABLE MARKER |
| END OF TABLE MARKER (FOR REDUNDANCY) | |

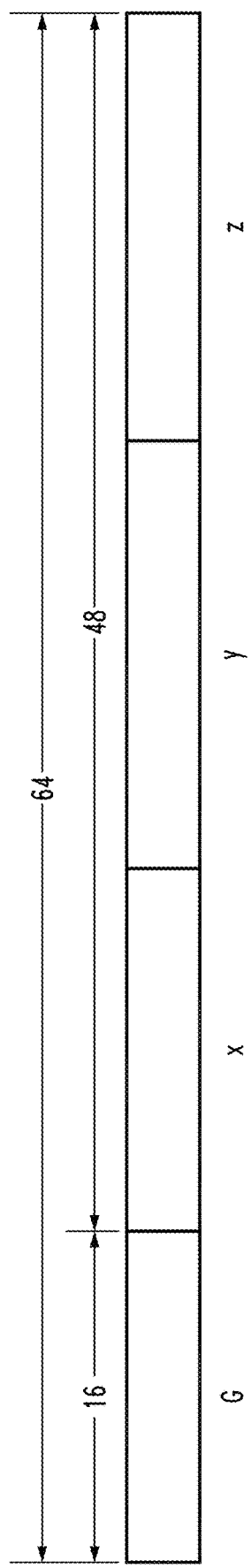
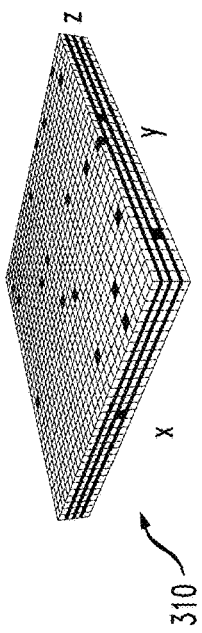
FIG. 3

FIG. 4
400

| ORIGINAL ABSOLUTE ADDRESS OF CONNECTION | | | |
|---|---|---|---|
| G | x | y | z |
| 10110111001001011 | 0101001010101010 | 1011011101010110 | 1000101011010111 |
| 10110111001001011\|0101001010101010\|1011011101010110\|1000101011010111<br>64 TOTAL ADDRESS BITS TO STORE | | | |

402 ↑

| RELATIVE ADDRESS OF CONNECTION, WITH RUN LENGTH ENCODING | | | |
|---|---|---|---|
| dG | dx | dy | dz |
| 00000000000000000 | 00000000000011101 | 00000000000011101 | 00000000000011101 |
| SIGN (dG,dx,dy,dz) | | | |
| 0010 FOR ++−+ | | | |
| 0010\|011011\|11101\|00000000000011101\|00000000000011101<br>4 SIGN BITS + 6 LEADING ZEROS BITS (27=011011 IN BINARY) + 37 INFORMATION BITS<br>(5 FROM x, 16 FROM y, 16 FROM z)<br>47 TOTAL ADDRESS BITS TO STORE | | | |

404 ↑

| RELATIVE ADDRESS OF CONNECTION, WITH RUN LENGTH ENCODING AND REARRANGEMENT | | | |
|---|---|---|---|
| dG | $dx_{msb}$, $dy_{msb}$, $dz_{msb}$, $dx_{smsb}$, $dy_{smsb}$, $dz_{smsb}$, .... | | |
| 00000000000000000 | 000000000000000000000000000000000000000000000111111111000111 | | |
| SIGN (dG,dx,dy,dz) | | | |
| 0010 FOR ++−+ | | | |
| 0010\|110001\|111111111000111<br>4 SIGN BITS + 6 LEADING ZEROS BITS (49=110001 IN BINARY) + 15 INFORMATION BITS<br>25 TOTAL ADDRESS BITS TO STORE | | | |

| TABLE HEADER: CELL m ABSOLUTE ADDRESS (64 BITS) AND CELL STATUS DATA (8 BITS) | | |
|---|---|---|
| SIGN BITS FOR CELL n1 | ENCODED NUMBER OF LEADING ZERO BITS FOR CELL n1 | VARIABLE LENGTH FIELD FOR CELL n1 WHICH CONTAINS ADDRESS DIFFERENCE BITS STARTING FROM FIRST NON-ZERO DIFFERENCE BIT THROUGH TO THE LAST DIFFERENCE BIT | 8 BIT DATA FOR THIS SYNAPSE |
| SIGN BITS FOR CELL n2 | ENCODED NUMBER OF LEADING ZERO BITS FOR CELL n2 | VARIABLE LENGTH FIELD FOR CELL n2 WHICH CONTAINS ADDRESS DIFFERENCE BITS STARTING FROM FIRST NON-ZERO DIFFERENCE BIT THROUGH TO THE LAST DIFFERENCE BIT | 8 BIT DATA FOR THIS SYNAPSE |
| SIGN BITS FOR CELL n3 | ENCODED NUMBER OF LEADING ZERO BITS FOR CELL n3 | VARIABLE LENGTH FIELD FOR CELL n3 WHICH CONTAINS ADDRESS DIFFERENCE BITS STARTING FROM FIRST NON-ZERO DIFFERENCE BIT THROUGH TO THE LAST DIFFERENCE BIT | 8 BIT DATA FOR THIS SYNAPSE |
| ... | ... | ... | ... |
| SIGN BITS FOR CELL nN | ENCODED NUMBER OF LEADING ZERO BITS FOR CELL nN | VARIABLE LENGTH FIELD FOR CELL nN WHICH CONTAINS ADDRESS DIFFERENCE BITS STARTING FROM FIRST NON-ZERO DIFFERENCE BIT THROUGH TO THE LAST DIFFERENCE BIT | 8 BIT DATA FOR THIS SYNAPSE |
| END OF TABLE MARKER | END OF TABLE MARKER | END OF TABLE MARKER | END OF TABLE MARKER |
| END OF TABLE MARKER (FOR REDUNDANCY) | END OF TABLE MARKER (FOR REDUNDANCY) | END OF TABLE MARKER (FOR REDUNDANCY) | END OF TABLE MARKER (FOR REDUNDANCY) |

505, 510, 520, 530, 540

600

700

SPACE-EFFICIENT DYNAMIC ADDRESSING IN VERY LARGE SPARSE NETWORKS

BACKGROUND

A neuromorphic computer (or cognitive computing system) mimics the processing of the human brain, which consists of a large network of neurons, or cells, connected at synapses. A cell typically has 1,000-10,000 synapses, each representing a connection to another cell. In a neuromorphic computer, this connectivity information is often stored in a lookup table. The total number of cells is very large (e.g., to mimic the human neo-cortex, there could be around 16 billion cells), and a cell can in principle connect to any other cell.

SUMMARY

Embodiments provide techniques for space-efficient dynamic addressing in very large sparse networks such as, but not limited to, a neuromorphic computer. More particularly, such techniques provide address compressibility of large multi-dimensional space by exploiting sparsity and locality of connections within the space.

For example, in one embodiment, a method comprises maintaining a connectivity look up structure for a network that comprises a plurality of nodes, each node is connectable to one or more other nodes, and nodes that are connected tend to be local to one another in the network, and the number of node connections in the network tends to be sparse in relation to the number of potential node connections in the network. The connectivity look up structure stores, for a given node, an address of each other node that is connected to the given node, wherein the stored address for the other node is represented as a run-length encoded difference between a full network address of the given node and a full network address of the other node.

Advantageously, illustrative embodiments of the invention provide a highly efficient representation to store address information about connecting neurons in a very large sparse neuromorphic computing network. Moreover, as the network learns, new synapse connections between neurons are formed. Therefore, in accordance with one or more embodiments, the storage representation is dynamic.

BRIEF DESCRIPTION OF THE DRAWING

FIG. 2 illustrates an address look up table for a neuromorphic computer, according to an embodiment of the invention.

FIG. 3 illustrates a space-efficient addressing scheme for a neuromorphic computer, according to an embodiment of the invention.

FIG. 4 further illustrates a space-efficient addressing scheme for a neuromorphic computer, according to an embodiment of the invention.

FIG. 5 illustrates a space-efficient address look up table for a neuromorphic computer, according to an embodiment of the invention.

DETAILED DESCRIPTION

Embodiments will now be described in further detail with regard to techniques for providing an efficient addressing scheme to store connectivity information associated with a neuromorphic computer. It is to be understood, however, that the efficient addressing scheme described herein is not limited to use with connectivity information associated with a neuromorphic computer but rather is more generally applicable to any network with local and sparse connectivity in relation to the overall number of nodes in the network.

As used herein with respect to a neuromorphic computer, the term "neuron cell" (or simply "neuron" or simply "cell") refers to a node in the neuromorphic computer (i.e., a node in one of the one or more neuromorphic integrated circuits or chips that constitute the neuromorphic computing network). In illustrative embodiments, such neuron cells may be fabricated using silicon semiconductor processing techniques. However, details of fabricating neuron cells and the synapses that connect them are known and not the focus of illustrative embodiments, and thus are not further described herein.

Figure 1B:
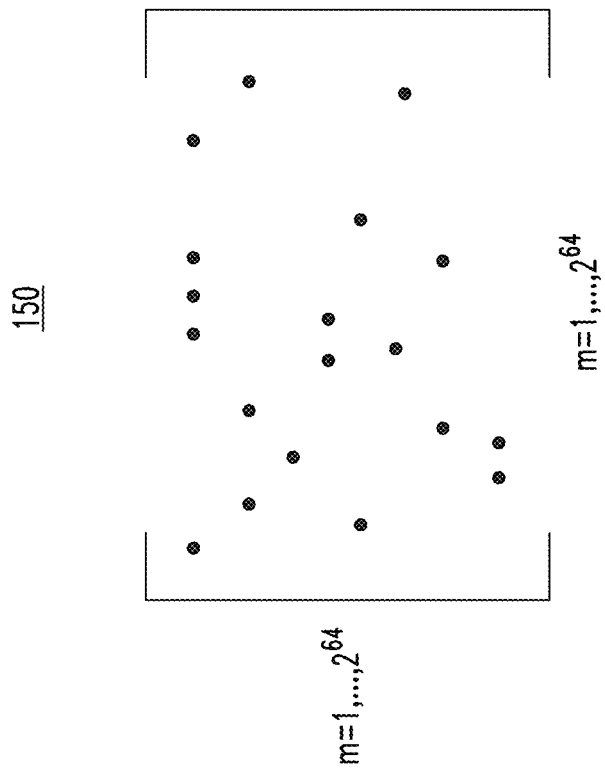
FIG. 1B illustrates a connectivity matrix for a neuromorphic computer, according to an embodiment of the invention.
Figure 1A:
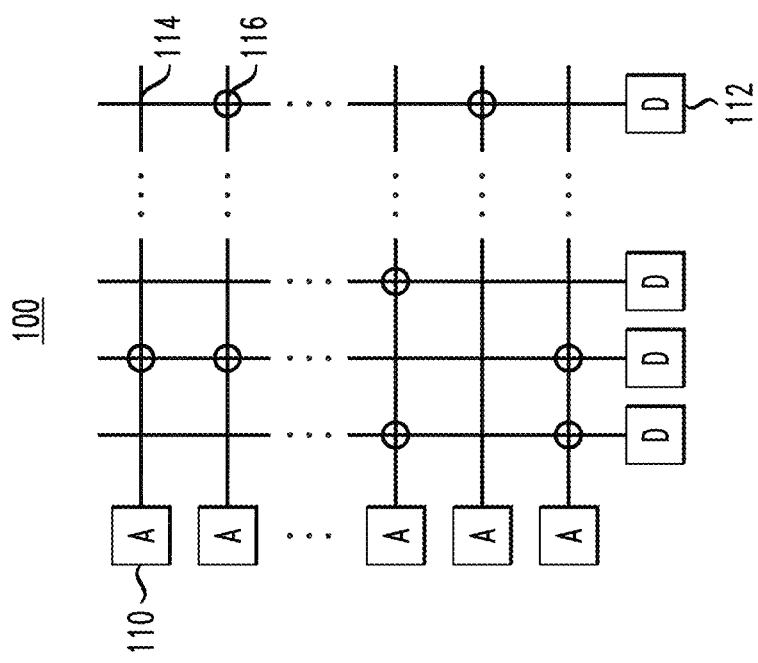
FIG. 1A illustrates a synapse array for connecting neurons in a neuromorphic computer, according to an embodiment of the invention.

FIG. 1A illustrates a synapse array 100 for connecting neuron cells in a neuromorphic computer, according to an embodiment of the invention. As is known, neuron cells comprise axons and dendrites, where an axon transmits an electrical impulse from the neuron cell and the dendrite receives an electrical impulse from another neuron cell. Thus, as shown in array 100, axons of neuron cells 110 are connected to dendrites of neuron cells 112. While the array shows all potential connection points 114, the circles 116 at certain points indicate an actual connection point between the corresponding two neurons for that synapse.

FIG. 1B illustrates a connectivity matrix 150 for a neuromorphic computer, according to an embodiment of the invention. More particularly, as shown, an m×m matrix with m=$2^{64}$ cells is assumed. It is to be appreciated that 64 bits is merely exemplary and, thus, addresses of alternative embodiments may have a smaller or larger number of bits. Each neuron cell could in principle be connected to any other neuron cell (each circle in the matrix represents an actual connection point), generating a huge but very sparse connectivity matrix. Each synapse might store only 8 bits of useful data (such as the strength or permanence of the connection) but, in a naïve addressing scheme, would require 64 bits to store the address of the cell to which it is connected, resulting in an inefficient ratio of address to data bits of 8:1.

FIG. 2 illustrates such an address look up table 200 for a neuromorphic computer. More particularly, a naïve address look up table (also can be considered a connection or synapse table or structure) is shown for a given neuron cell m connected to N neuron cells n1, n2, n3, . . . , nN. The 64 bit address of neuron cell m and each 64 bit address for each neuron cell connected to neuron cell m is represented in column 210 of look up table 200. The 8 bit data associated with each synapse connecting neuron cell m with each neuron cell is represented in column 220 of look up table 200. Note that the addresses for each neuron cell in look up table 200 are considered "absolute" addresses. This means that the 64-bit address for each neuron cell in look up table 200 is a unique full (global) network address that accounts for the full size of the overall network that the neuron cells and synapses form. Thus, the size of look up table 200 is inefficiently large since it needs to include the 64-bit absolute address for each neuron cell, in addition to the 8-bit data stored for each address. To add to the inefficiency, it is realized that the length of the table grows (shrinks) dynamically as a given neuron cell forms new connections (destroys existing connections).

FIG. 3 illustrates a space-efficient addressing scheme 300 for a neuromorphic computer, according to an embodiment of the invention. Embodiments of the invention realize that while the absolute (full network) address for a cell is 64 bits (i.e., a cell has a logical address space of 64 bits), the network space (i.e., array 100 or matrix 150) can advantageously be functionally divided into multiple regions, levels, and/or layers, referred to herein as logical sub-areas. Thus, as illustrated in this one simple example, the full network space is functionally divided into logical sub-areas of synapse connections. One such logical sub-area is illustrated in FIG. 3 as three-dimensional (3-D) logical sub-area 310 (where each neuron has an x, y, and z coordinate). It is understood that the full network space is divided into multiple such 3-D logical sub-areas. Note that a sub-area is logical (functional) in nature and has no physical implication on the neuromorphic computer.

Accordingly, in the exemplary addressing scheme 300 shown in FIG. 3, the 64 bits for addressing are structured such that the first field of the address of a neuron cell is used to uniquely identify the logical sub-area in which the neuron cell is located. In this example, the first 16 bits are allocated to field G which is used to represent the specific logical sub-area for the given neuron cell. This field can be considered as a global (absolute) locator for the neuron cell. It is to be appreciated that, in alternative embodiments, the global locator can be divided into more than one field if so desired.

Then, the remaining bits, 48 bits in this example, are structured into a set of fields which uniquely identifies the location of the cell within a specific logical sub-area. In this example, the remaining 48 bits are allocated into 16-bit fields x, y and z which are used to represent the location of the given neuron cell within the 3-D logical sub-area 310. These fields can be considered as a local locator for the neuron cell. Accordingly, the address of a neuron cell in a given sequence memory (i.e., in a given logical sub-area) is defined by fields x, y and z (coordinates of the 3-D space of the logical sub-area), while the sequence memories are identified by non-zero bits in field G.

FIG. 4 further illustrates the space-efficient addressing scheme for a neuromorphic computer, according to an embodiment of the invention. Embodiments of the invention realize that, since most connections are local (i.e., most neuron cells are connected to other neuron cells within the same logical sub-area), it may be more efficient to store only the difference between given cell m and its connecting cells n1, n2, n3, . . . , nN, although this results in many leading zeros in the address difference. Therefore, it is further realized that it is efficient to not store the leading zeros explicitly, but in some form of run-length encoding, e.g., in an encoding process that efficiently indicates which bit is the first non-zero bit in the address field. To increase the number of leading zero bits, we store the respective bit differences between the x, y and z fields of the given neuron cell and the connecting neuron cell (i.e., dx, dy, and dz) as interspersed sets of differences, as will be evident in example 400 shown in FIG. 4. This makes the leading zeros in the dy and dz fields available for the run-length encoding. Note that, in illustrative embodiments, the z field is placed at the end of the address space, since it typically will always contain ones.

Thus, as shown, in FIG. 4, a difference between the full network address of a given neuron cell and the full network address of another neuron cell that is connected to the given neuron cell is represented as a difference between each corresponding bit in fields G, x, y and z, for the connected neuron cells is computed. In FIG. 4, assume that the full network (original absolute) 64-bit address of the connecting neuron is shown in 402. Assume also, although not expressly shown, that the full network (original absolute) 64-bit address of the given neuron for which connections are being stored is represented as G|x|y|z:

1011011001001011|0101001010110111| 1011011101001011|1000101011001010.

The difference between each full network address is computed on a corresponding bit-by-bit basis, as dG, dx, dy, and dz. Section 404 of example 400 illustrates a first address difference which may be referred to herein as "difference with no rearrangement." Note that 4 of the last 5 bits of dx, dy, and dz are value "1" (meaning the logical locations of the cells differ by just a few bits in the x, y and z coordinates, i.e., they are close to one another in the overall network). This "difference with no rearrangement" is the address difference without storing dx, dy, and dz as sets of differences. However, in order to increase the number of leading zeros, corresponding bits of dx, dy, and dz are interspersed in sets as explained above, thus resulting in the second address difference illustrated in 406 which may be referred to herein as "difference with rearrangement." More particularly, to increase the number of leading zero bits (i.e., meaning that the values of the corresponding bits are the same thus resulting in a zero), we store dx, dy, and dz as sets of differences (i.e., $dx_{msb}$, $dy_{msb}$, $dz_{msb}$, $dx_{smsb}$, $dy_{smsb}$, $dz_{smsb}$, . . . $dx_0$, $dy_0$, $dz_0$) as shown in 406. Note that 'msb' refers to most significant bit, and 'smsb' refers to second most significant bit, and so on. Then, as shown in 406, a large portion of the 64-bit address difference includes bit values of zero, while only a small portion of the 64-bit address difference has non-zero bits.

Note also that each difference representation, 404 and 406, also utilizes 4 sign bits that are employed when decoding the local addresses to indicate whether the difference bit is a −1 or a +1 (this information being used to determine the full network address of the given neuron cell versus the full network address of the connecting neuron cell, e.g., 1−0=+1, while 0−1=−1).

Note also how the number of leading zeros from the "difference with rearrangement" representation 406 as compared to the "difference with no rearrangement" representation 404 has advantageously increased from 27 to 49. The number of leading zero difference bits of 49 is represented in a 6-bit binary form of 110001 (i.e., 110001 is binary for the number 49). This encoding of the number of leading zeros is referred to as a "run-length encoded difference."

This run-length encoded difference is considered the second address part stored in column 520 of look up table 500 in FIG. 5, further described below. Note that column 510 of look up table 500 in FIG. 5 stores the sign bits (first) address part. With the leading zero difference bits of 49, the remaining portion of the address difference is the 15-bit field of 111111111000111 which is considered the third address part stored in column 530 of look up table 500. Note that the third address part is considered variable length because its length depends on how many leading zeros are represented in the second address part (i.e., where the first non-zero bit is located in the address difference).

Note also with respect to FIG. 5, look up table 500 comprises a table header 505 with the absolute address or full network address (64 bits) of the given neuron cell m and cell status data (8 bits), and entries for each neuron cell n1, n2, n3, . . . , nN connected to the given memory cell m. More particularly, each row for a given connected neuron cell (n1, n2, n3, . . . , nN) includes the first address part which is the sign bits (column 510), the second address part that comprises a run-length encoded representation (e.g., 6 bits) of the number of leading zero bits of the address difference (column 520), and a third address part that comprises a variable length field (e.g., 1, . . . , up to 64 bits) which contains entries of the 64-bit address difference starting from the first non-zero difference bit through the last difference bit (column 530). Each row also comprises 8-bit data for the corresponding synapse connecting the two neuron cells (column 540).

Thus, advantageously, the 64-bit address difference using the "difference with rearrangement" representation (406) in the specific example in FIG. 4 is compressed (encoded) into 25 bits (4 sign bits, 6 encoded leading zero bits, and 15 remaining information bits) resulting in significant storage reduction for the memory that implements the look up table.

Figure 6:
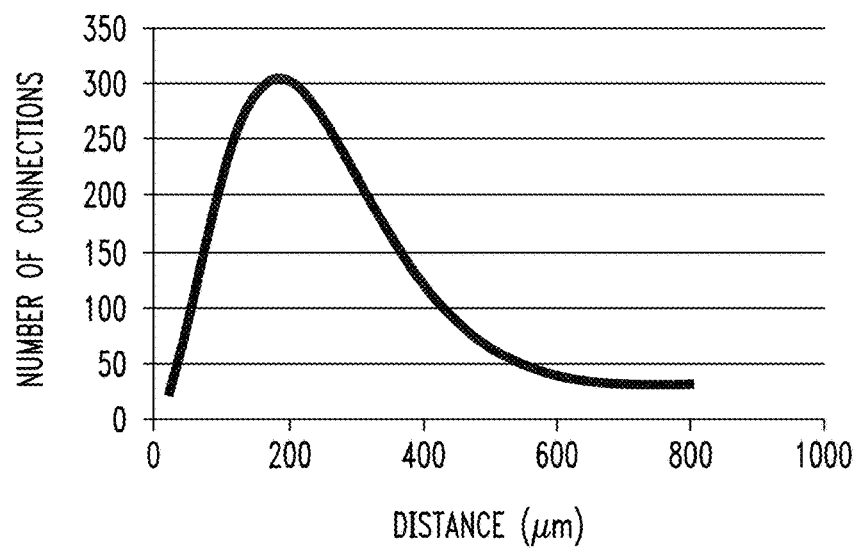
FIG. 6 illustrates a plot depicting locality of neuron connections for a neuromorphic computer, according to an embodiment of the invention.

FIG. 6 illustrates a plot 600 depicting locality of neuron connections for a neuromorphic computer, according to an embodiment of the invention. In this example, assume that the network includes $2^{36}$=68 billion cells total, such that any cell can in principle connect to any other cell. Further, assume 4000 connections/cell at 36 address bits/connection, and 8 data bits/connection. Simple encoding for one cell with 4000 connections would be:

Address space: 4000×36b=144 kb
Data space: 4000×8b=32 kb
Ratio of address space to data space is 4.5:1.

In contrast, consider run-length encoding for one cell with 4000 connections. It is realized that as distance from a cell increases, the number of possible connections to any given neuron drops, but the number of neurons increases. This results in a peak in the number of connections as a function of distance, as plot 600 in FIG. 6 illustrates, the peak is at around 200 micrometers (um). Thus, connections are highly localized within a certain distance and, as such, very long-range connections are rare.

Using plot 600, we find on average 9 bits are required to represent each connection (worst case), plus 4 sign bits, plus 5 bits for the number of non-zeros, which totals 18 address bits/connection.

Address space: 4000×18b=72 kb
Data space: 4000×8b=32 kb
Ratio of address space to data space is 2.25:1, which is a large improvement over simple encoding.

Advantageously, as described herein, illustrative embodiments provide an efficient addressing scheme to store memory connections in a compressed format where only a fraction of the number of bits of the full address are used to uniquely address the synaptic connection, compared to the full amount of bits of the full address in a simplistic implementation. The scheme achieves efficiency by exploiting the tendency for connections to be local, but still allows for complete generality and dynamic growth in connectivity.

Figure 7:
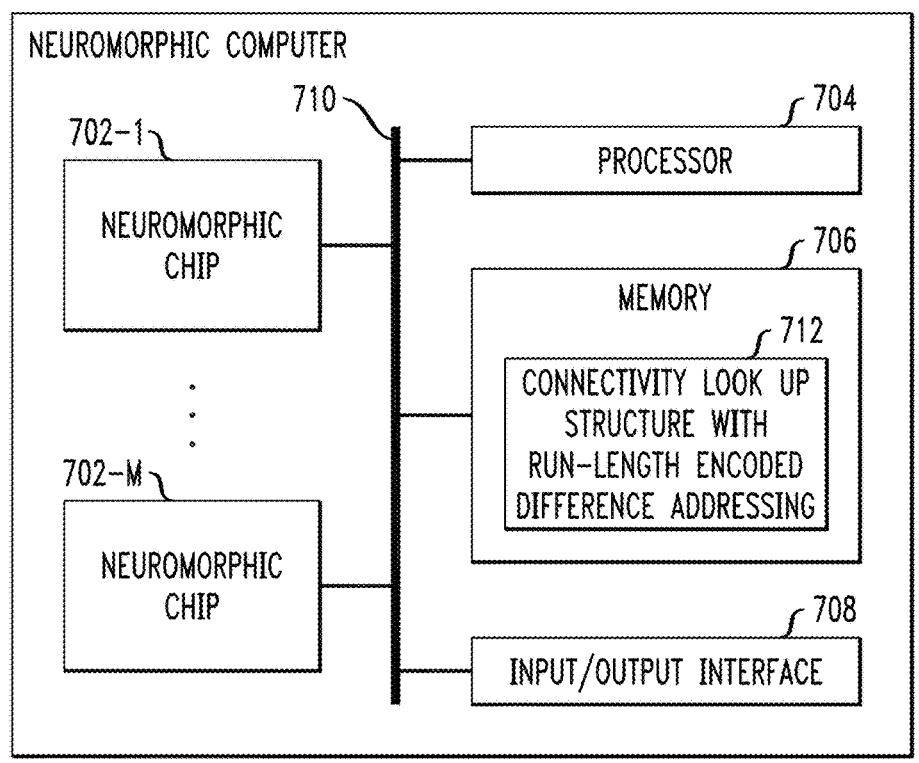
FIG. 7 illustrates a neuromorphic computer, according to an embodiment of the invention.

FIG. 7 illustrates a neuromorphic computer 700, according to an embodiment of the invention. More particularly, neuromorphic computer 700 comprises one or more neuromorphic chips 702-1, . . . , 702-M. The neuron cells and synapses, as described in various embodiments herein, are formed as part of the one or more neuromorphic chips 702-1, . . . , 702-M. The neuromorphic computer 700 also comprises a processor device 704, memory 706, and input/output interface 708. The elements of neuromorphic computer 700 are operatively coupled via a communication bus 710. The input/output interface 708 is configured to enable the neuromorphic computer 700 to communicate with one or more other systems (which may include one or more other neuromorphic computers) over a communications network (not expressly shown) which may include, private networks (Intranets), public networks (Internet), or combinations thereof.

The processor 704 (e.g., microprocessor) and memory operate to execute a neuromorphic application that utilizes the one or more neuromorphic chips 702-1, . . . , 702-M. The neuromorphic application may, by way of example only, be a pattern matching software program, an artificial intelligence software program, etc. In this illustrative embodiment, the processor 704 functions as an overall command processor for executing the neuromorphic application, while each of the one or more neuromorphic chips 702-1, . . . , 702-M manage the connectivity look up structure 712 (e.g., table 500 in FIG. 5) for use in accessing the neuron cells of the one or more neuromorphic chips 702-1, . . . , 702-M during execution of the neuromorphic application. That is, a given neuromorphic chip 702 functions as a "processor device and memory" and performs address encoding (i.e., address compression described above in FIGS. 3-6) and decoding (address decompression whereby the compressed address is returned to the absolute 64-bit form). Connectivity look up structure 712 stores the efficient run-length encoded difference addresses (compressed addresses) described herein in accordance with one or more illustrative embodiments.

Embodiments of the invention may be a system, a method, and/or a computer program product at any possible technical detail level of integration. The computer program product may include a computer readable storage medium (or media) having computer readable program instructions thereon for causing a processor to carry out aspects of the invention. For example, neuromorphic computer 700 may comprise a computer program product for implementing embodiments of the invention disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network (e.g., network 520), including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments have been described herein with reference to the accompanying drawings, it is to be understood that the invention is not limited to those precise embodiments, and that various other changes and modifications may be made by one skilled in art without departing from the scope or spirit of the invention.

What is claimed is:

1. A method comprising:
   maintaining a connectivity look up structure for a network that comprises a plurality of nodes, each node is connectable to one or more other nodes;
   wherein the connectivity look up structure stores, for a given node, an address of each other node that is connected to the given node, and wherein the stored address for the other node is represented as a run-length encoded difference between a full network address of the given node and a full network address of the other node; and
   wherein the stored address comprises a first address part that represents sign bits, a second address part that represents a number of zero difference bits, and a third address part that comprises the difference bits from a first non-zero difference bit to the end of the difference bits.

2. The method of claim 1, wherein a full network address for a node comprises one or more fields that represent a logical sub-area of the network in which the node is located, and one or more fields that represent the location of the node within the logical sub-area.

3. The method of claim 1, wherein the second and third address parts further represent bits positioned as bit sets of differences between at least two of the fields that represent the location of the node within the logical sub-area.

4. The method of claim 2, wherein the network is divided into a plurality of logical sub-areas.

5. The method of claim 4, wherein one or more of the plurality of logical sub-areas are three-dimensional logical sub-areas.

6. A method comprising:
maintaining a connectivity look up structure for a neuromorphic computing network that comprises a plurality of neuron cells, each neuron cell is connectable to one or more other cells via one or more synapses;
wherein the connectivity look up structure stores, for a given neuron cell, an address of each other neuron cell that is connected to the given neuron cell, and wherein the stored address for the other neuron cell is represented as a local difference between a full network address of the given neuron cell and a full network address of the other neuron cell; and
wherein the stored address comprises a first address part that represents sign bits, a second address part that represents a number of zero difference bits, and a third address part that comprises the difference bits from a first non-zero difference bit to the end of the difference bits.

7. The method of claim 6, wherein the local difference between the full network address of the given neuron cell and the full network address of the other neuron cell comprises a run-length encoded difference.

8. The method of claim 6, further comprising accessing the connectivity look up structure to obtain address information for one or more neuron cells in the neuromorphic computing network.

9. The method of claim 8, further comprising executing a neuromorphic application program in accordance with the obtained address information for the one or more neuron cells in the neuromorphic computing network.

10. The method of claim 6, wherein the second and third address parts further represent bits positioned as bit sets of differences between at least two fields that represent the location of a node within a logical sub-area.

11. The method of claim 10, wherein the logical sub-area is a three-dimensional logical sub-area.

12. The method of claim 6, wherein a full network address for a neuron cell comprises one or more fields that represent a logical sub-area of the neuromorphic computing network in which the neuron cell is located, and
one or more fields that represent a location of the neuron cell within the logical sub-area.

13. An apparatus comprising:
a processor; and
a memory operatively coupled to the processor and configured to maintain a connectivity look up structure for a network that comprises a plurality of nodes, each node is connectable to one or more other nodes;
wherein the connectivity look up structure stores, for a given node, an address of each other node that is connected to the given node, and wherein the stored address for the other node is represented as a run-length encoded difference between a full network address of the given node and a full network address of the other node; and
wherein the stored address comprises a first address part that represents sign bits, a second address part that represents a number of zero difference bits, and a third address part that comprises the difference bits from a first non-zero difference bit to the end of the difference bits.

14. The apparatus of claim 13, wherein a full network address for a node comprises one or more fields that represent a logical sub-area of the network in which the node is located, and one or more fields that represent the location of the node within the logical sub-area.

15. The apparatus of claim 13, wherein the second and third address parts further represent bits positioned as bit sets of differences between at least two of the fields that represent the location of the node within the logical sub-area.

16. The apparatus of claim 14, wherein the network is divided into a plurality of logical sub-areas.

17. The apparatus of claim 16, wherein one or more of the plurality of logical sub-areas are three-dimensional logical sub-areas.

18. The apparatus of claim 13, wherein the network comprises a neuromorphic computing network and the plurality of nodes comprises a plurality of neuron cells.

19. The apparatus of claim 18,
wherein the processor is configured to execute a neuromorphic application program in accordance with an obtained address information for the plurality of neuron cells in the neuromorphic computing network.

20. The method of claim 12, wherein the neuromorphic computing network is divided into a plurality of logical sub-areas.

* * * * *